Patented Oct. 3, 1950

2,524,079

UNITED STATES PATENT OFFICE 2,524,079

PRODUCTION OF A COPOLYMER MONOHYDRIC PHENOL-DIHYDRIC PHENOL-ALDEHYDE RESIN IN THE PRESENCE OF AN ALKALINE CATALYST

Philip H. Rhodes, Butler, Pa., assignor, by mesne assignments, to Koppers Company, Inc., a corporation of Delaware No Drawing. Application September 1, 1945, Serial No. 614,096

8 Claims. (Cl. 260—54)

1

The present invention relates to the manufacture of copolymer, permanently fusible, monohydric phenol-dihydric phenol-aldehyde resins. More specifically, it relates to the manufacture of copolymer, permanently fusible resins produced from monohydric phenols, as, for example, phenol per se, ortho, meta, or para cresol, the xylenols, and commercial cresylic acids; and dihydric phenols such as resorcinol, catechol and hydroquinone.

The art of making phenol-formaldehyde resins is well known and there are several references in the literature relating to the manufacture of resins from a combination of phenol and resorcin. Such references are found in British Patent No. 530,934, the Kessler U. S. Patent No. 1,889,751, and Novotny U. S. Patent No. 1,802,390. However, the methods set forth in these various patents are not applicable to the commercial production of permanently fusible, copolymer, monohydric phenol-dihydric phenol-aldehyde resins. British Patent No. 350,934 discloses the production of a resin by taking a 50% solution of a phenol-formaldehyde resin and adding to it resorcin and paraformaldehyde together with a coloring material. It is pointed out that the ratio of the resorcinol to the formaldehyde is 1:1, said ratio being the ratio necessary to produce a heat reactive and not a permanently fusible resin. After the alcoholic solution of the phenol-formaldehyde resin, resorcin, paraformaldehyde and coloring material is prepared, it is introduced into a quantity of wood flour and mixed for a period of 2 hours. Then the impregnated mass is air-dried or vacuum-dried at room temperature until the solvents have been eliminated. Following the drying operation the mixture is rolled two or three times at 120°, ground, sifted and mixed with an additional quantity of paraformaldehyde. The product so produced is a heat reactive product and not a permanently fusible product. In addition the reaction product is not a copolymer resorcin-phenol resin but rather a phenol resin having interspersed therein what is apparently a preliminary partial condensation product between resorcin and paraformaldehyde. A product of this nature is quite unlike the homogeneous mass of copolymer, permanently fusible resin produced in accordance with the present invention.

Kessler in U. S. Patent No. 1,889,751 sets forth a very broad disclosure comprising mixing phenol and resorcin by mutually dissolving them in each other, following which the mixture of phenols is reacted upon by aldehydes with or without a basic

2 catalyst. It is stated that the amount of aldehyde used may be varied within wide limits, depending on the nature of the finished resin that is desired. For more fusible and soluble resins it is stated that the amount of aldehyde used may be less than equi-molecular proportions. Kessler proceeds to state that where resins are desired which are to be finally condensed into hard, insoluble and infusible condensation products, equi-molecular or greater than equi-molecular proportions of aldehyde may be used. However, the Kessler patent does not disclose a precise or operable example for the manufacturing of resins from phenol and resorcin with aldehydes. When this method is tried in the laboratory it is noted that the resorcin reacts with the major proportion of the aldehyde, resulting in a set-up, resorcin-formaldehyde resin having interspersed therein a considerable amount of free phenol and free formaldehyde. This will occur regardless of the type of catalyst employed or regardless of the amount of aldehyde involved. The product produced by the Kessler disclosure is not a copolymer, permaently fusible, monohydric phenol-dihydric phenol-aldehyde resin such as that set forth in the present invention.

Novotny in U. S. Patent No. 1,802,390 discloses a number of resorcin-phenol-aldehyde resins, all of which are heat reactive and none of which are permanently fusible, brittle, copolymer products. It was observed when the Novotny reactions were run in the laboratory that in each case the reaction was impossible to control and the resulting product rapidly went to a rubbery, setup mass, entirely useless for the purposes set forth in the present application.

Thus it is quite clear that the Novotny resins are not brittle, copolymer, fusible resins such as those produced in accordance with the present invention.

Many of these difficulties are pointed out in my copending application, Serial No. 454,606, filed August 12, 1942, now Patent No. 2,385,373 which discloses a method for the production of copolymer, permanently fusible, monohydroxy phenol-dihydroxy phenol-aldehyde resins employing an acidic catalyst. It has been discovered that when an alkaline catalyst is substituted for the acidic catalyst in the method set forth in the copending application that the resulting product is almost always a gelled-up, useless mass similar to those produced in the prior art methods herein referred to. However, using the method of the present invention hereinafter set forth in specific examples, it has been discovered that it is possible to produce permanently fusible, brittle, copolymer, monohydric phenol-dihydric phenol-aldehyde resins of homogeneous character and reproducible chemical and physical properties.

The present invention is directed to the production of a permanently fusible copolymer monohydric phenol-dihydric phenol-aldehyde resin comprising heat-forming in the presence of an alkaline catalyst an undehydrated reaction product of a monohydric phenol, as for example, phenol per se $C_6H_5OH$ and a resin forming aldehyde, separately heat-forming an undehydrated primary reaction product of a dihydric phenol and a resin-forming aldehyde, and mixing said primary reaction products, the molar ratio of the aldehyde reactants in the mixture to the total phenolic contents of the mixture being maintained to produce a permanently fusible resin. The mixture is then heated to effect inter-condensation of the primary monohydric phenol-aldehyde condensation product with the primary dihydric phenol-aldehyde condensation product and to produce a substantially homogeneous undehydrated liquid resin. The resulting liquid resin mass is then dehydrated and further condensed to produce a substantially anhydrous copolymer condensation product. The production of the primary reaction products is preferably effected under reflux conditions and after the primary condensation products are mixed, further heating of the mixture is preferably effected under reflux temperatures and conditions for a suitable period of time until the mixture is substantially free of uncombined aldehyde.

It is well-known in the art, in order to produce a permanently fusible resin, that the molar ratio of the aldehyde reactants in the mixture to the total phenolic reactants in the mixture must be less than one of the former to one of the latter.

More specifically, in accordance with the present invention, a monohydric phenol and a resin-forming aldehyde are heat reacted in the presence of an alkaline catalyst and preferably under reflux temperatures and conditions. Separately there is dissolved a dihydric phenol in a resin-forming aldehyde and the ratio of the latter to the former is maintained to produce a permanently fusible resin. The resulting liquid solution is then heated to form a primary dihydric phenol-aldehyde condensation product. The two primary condensation products are then mixed and heated to effect inter-condensation of said primary condensation products and to produce a substantially homogeneous undehydrated liquid resin. The latter mass is then dehydrated and further condensed to produce a substantially anhydrous copolymer condensation product.

There may be substituted for the dihydric phenol a trihydric phenol, such as phloroglucinol.

The present invention will be specifically illustrated by the following examples:

EXAMPLE I

*Producing a resin containing 10% of phenol and 90% resorcin based on the molar proportions of said phenols in the phenolic body of the resin*

The following ingredients are mixed in the following proportions:

280 grams of phenol (U. S. P. crystals)
165 grams of 37% formaldehyde
6 grams of sodium hydroxide
20 grams of water The phenol is melted in a reaction kettle and then formaldehyde is introduced therein followed by the addition of the sodium hydroxide which has been previously dissolved in water. Under agitation the mixture is gradually heated to reflux and maintained there until the formaldehyde is substantially completely reacted with the phenol to form a primary undehydrated phenol-aldehyde condensation product.

Separately 2970 grams of resorcin are dissolved in 1485 grams of 37% formaldehyde solution in a second reaction kettle. Heat is applied gradually to prevent any sudden exothermic reaction. After solution occurs, heating is continued until an exothermic reaction is initiated, which usually occurs at a temperature between 65° C. to 75° C. Obviously, the temperature at which the exothermic reaction will occur will depend to some extent on the character of the reacting constituents and other physical conditions thereof. At the conclusion of the exothermic reaction, the resulting hot liquid resin solution is added gradually to the phenol-formaldehyde undehydrated primary condensation product. During the addition, the contents of the reaction kettle are maintained at reflux. The latter varies usually from about 95° C. to 102° C. After the resorcin-formaldehyde primary condensation product has been added to the phenol-aldehyde condensation product present in the first reaction kettle, the contents thereof are maintained under reflux conditions for a period of time sufficient to assure the inter-condensation of the primary phenol-formaldehyde condensation product with the primary resorcin-formaldehyde condensation product. When using the above set forth quantities of reactants, usually about 15 to 30 minutes' additional refluxing is desirable. This time limit is merely illustrative and is not by way of limitation. The final refluxing period should be sufficient, as stated, to effect inter-condensation of the primary condensation products and produce a substantially homogeneous liquid resin. The completion of the inter-condensation step is usually evidenced by the substantially complete absence of any free formaldehyde.

Thereafter, the inter-condensation product is subjected to distillation for the purpose of removing the water present in the condensation products and to effect further condensation and polymerization of the initial inter-condensation product. The distillation is preferably, although not necessarily, effected at atmospheric pressure until a substantial proportion, as for example, 80% to 90%, of the water present in the inter-condensation product is removed. Preferably, a major portion of the water is removed by the time the temperature of the reaction mass reaches about 130° C. to about 135° C. The temperature of the reaction mass continually increases from reflux temperature to about the range set forth as water is removed. Thereafter, removal of the major portion of the water is effected under vacuum distillation, said distillation also functioning to remove any unreacted material, or materials, including phenol. By the time that the water has been substantially completely removed from the copolymer reaction product, the temperature of the molten mass has reached 155° C. to about 165° C. at a vacuum of 26 to 28 inches, the vacuum building up from zero as the distillation progresses.

Thereafter, the molten liquid material is removed from the reaction kettle and permitted to cool to thereby form a clear, brittle, permanently fusible copolymer phenol-resorcin-formaldehyde resin. As well known in the art, for the production of a permanently fusible phenol-aldehyde resin it is necessary that the molar ratio of the phenol to the aldehyde be less than 1 mole of the aldehyde for each mole of the phenolic body, the latter including, in the example given, both the phenol and resorcin.

The resin produced in accordance with the above example evidenced a softening point of 109.5° C. when tested on a variably heated copper bar. The resin showed no detectable free phenol, and contained less than .5 of 1% of moisture when tested in accordance with the standard A. S. T. M. method.

In the above example, the molar ratio of the formaldehyde to the phenol is less than 1:1, and the molar ratio of the formaldehyde to the resorcin is less than 1:1. In the example given, the molar ratio of the formaldehyde to the phenol is approximately 2:3, or stated differently, .67:1, whereby a permanently fusible resin is produced.

In Example I the ratio of the formaldehyde to the resorcin is also less than 1:1, it being .67:1. These ratios are merely exemplary, it being within the scope of the present invention to prepare the monohydric phenol-aldehyde condensation product, in which the ratio of the aldehyde to the phenol may vary from as low as .5:1 to as high as 1.5:1. The ratio of the resorcin to the formaldehyde in the separately prepared permanently fusible condensation product may vary from somewhat below .5 to 1 of the aldehyde to about .9 to 1 of the resorcin. The above is subject to the limitation that when the two primary liquid reaction products are mixed with each other and prior to dehydration, the molar ratio of the aldehyde in the mixture to the total phenolic reactants in the mixture, including phenol and resorcin, is less than 1 of the formaldehyde or other aldehyde to less than 1 of the phenolic constituents, including both phenol and resorcin. Stated more broadly, in the final mixture prior to dehydration, the ratio of the aldehyde, as for example formaldehyde, to the total monohydric and dihydric phenolic bodies present in the mixture must be less than 1 of the aldehyde to 1 of the total phenolic body so as to produce as a final product a permanently fusible copolymer monohydric phenol-dihydric phenol-aldehyde resin.

EXAMPLE II

*Production of a resin, the phenolic body of which contains 50% monohydric phenol and 50% dihydric phenol taken on a molar basis*

An undehydrated reaction product of phenol and formaldehyde is produced by reacting the following ingredients:

1560 grams of 90% aqueous phenol solution
825 grams 37% formaldehyde
28 grams sodium hydroxide
100 grams of water The phenol and formaldehyde in the proportions above set forth are first introduced into the reaction kettle and are followed by the addition of the sodium hydroxide dissolved in water. Under agitation the mass is gradually heated to reflux and maintained until the formaldehyde is substantially completely reacted with the phenol to form a primary undehydrated phenol-aldehyde condensation product.

There is then introduced into a separate reaction kettle 1650 grams of resorcin. Thereafter, there is added to the resorcin 500 grams of 37% formaldehyde. Heating is gradually applied with agitation until an exothermic reaction occurs. Thereafter the temperature of the resulting reaction mixture is raised to reflux temperature, and 325 grams of 37% formaldehyde is gradually added while maintaining a reflux temperature. There is thereby produced a primary undehydrated resorcin - formaldehyde condensation product. This product is preferably maintained in the kettle at a temperature which adapts it to be pumped, as for example, the temperature varying between 90° C. and 100° C.

The resorcin-formaldehyde condensation product is then gradually added to the phenol-formaldehyde condensation product present in the first reaction kettle, the addition being preferably effected while the phenol-formaldehyde condensation product is maintained at a reflux temperature. The inter-condensation of these two components, and subsequent dehydration is effected in a manner similar to that set forth in Example I.

The product produced is a brittle, permanently fusible copolymer phenol resorcin-formaldehyde resin having a softening point on the copper bar of 107.5° C. The resin shows no detectable free phenol and has less than .5% to 1% of moisture.

EXAMPLE III

*Production of a resin, the phenolic body of which contains 90% phenol and 10% resorcin taken on a molar basis*

An undehydrated reaction product is produced by reacting the following ingredients:

2538 grams U. S. P. phenol crystals
1485 grams 37% formaldehyde solution
50 grams sodium hydroxide
200 grams of water.

The phenol and formaldehyde is reacted as set forth in Example I to produce a primary undehydrated phenol-aldehyde condensation product.

In the above, the molar ratio of the formaldehyde to the phenol is .67:1, and produces a permanently fusible resin.

To the kettle containing the primary undehydrated phenol-formaldehyde condensation product there is added a resorcin-aldehyde condensation product produced in the following manner. First, into a separate reaction kettle there is introduced 330 grams of resorcin, 200 grams of water, and 65 grams of 37% formaldehyde. The mixture is gradually heated to reflux temperature. The time of heating may vary considerably. It is only necessary to heat these ingredients to reflux temperature before the mixture is ready to use. After heating, the resorcin-formaldehyde condensation product is added to the kettle containing the undehydrated primary phenol-formaldehyde condensation product in the same manner as in the previous two examples. Thereafter, the mixture is refluxed and dehydrated as set forth in Examples I and II to thereby produce a brittle, permanently fusible copolymer monohydric phenol-dihydric phenol-aldehyde resin.

The softening point of the so-produced resin is 97° C. The resin contained less than .5 of 1% of free phenol and less than .5 of 1% of water.

The final copolymer resin is substantially anhydrous and usually contains less than .25% to .5% of water although in some cases the water may be as high as 1%.

While phenol (C₆H₅OH) has been set forth as an example of a monohydric phenol which may be condensed with formaldehyde to form the primary condensation product, it is within the province of the present invention to use other monohydric phenols, as for example, the cresols, xylenols, and cresylic acids.

While resorcin has been set forth as an example of a dihydric phenol, it is to be understood that in the examples given the resorcin may be substituted by other dihydric phenols including catechol, hydroquinone, orcin, and the like. In the examples given, for the dihydroxy phenols of which resorcin is exemplary, there may be substituted a trihydroxy phenol such as phloroglucinol.

Instead of using formaldehyde as the resin-forming aldehyde for the monohydric phenol or the dihydric phenol, other resin-forming prior art aldehydes may be used such as acetaldehyde, propyl aldehyde, butyl aldehyde, furfuraldehyde, and the like. Dialdehydes may also be used such as glyoxal. Instead of using a single aldehyde a mixture of aldehydes may be used.

While the reaction between the monohydric phenol and the aldehyde is carried out in the examples given in the presence of sodium hydroxide as the catalyst, it is within the province of the present invention to use other alkaline catalysts such as potassium hydroxide, barium hydroxide, calcium hydroxide, ammonium hydroxide; and amines such as triethanol amine, ethylene diamine, and the like. Commercial triethanol amine is an impure product containing a certain proportion of di and mono ethanol amine.

Other alkaline catalysts which may be used are the alkaline salts as for example, sodium, potassium, or lithium carbonates, tribasic sodium phosphate and the like which are usually used as alkaline catalysts in the production of thermosetting resins.

Although no catalyst has been set forth for use in catalyzing the dihydroxy phenol-aldehyde reactions, both acidic and alkaline catalysts may be employed as is well known, it being pointed out that the prior art has established that no catalyst is necessary for the initiation of reaction between resorcin and formaldehyde.

In the examples given the amount of sodium hydroxide functioning as the catalyst is around 2% taken on the weight of the monohydric phenolic body. However, this may vary considerably depending on the alkaline strength of the catalyst employed. In general, it is necessary that sufficient catalyst be employed to form the primary condensation product in which the formaldehyde is substantially completely reacted with the phenolic body. Broadly, the percentage of catalyst may vary between about .2 of 1% to 10%, but preferably 1% to 5%, said percentages all being taken on the weight of the monohydric phenol used to produce the monohydric phenol-aldehyde primary condensation product.

The dry, brittle copolymer permanently fusible resin produced as herein set forth may be set and/or hardened with a reactive methylene-containing setting or hardening agent as for example, hexamethylenetetramine, paraform, formaldehyde or any formaldehyde-liberating polymer or homolog of formaldehyde. Methylol compounds such as dimethylol urea, dimethylolthiourea, dimethylol, trimethylol and polymethylol melamines, and other reactive methylol compounds may be used.

The setting and/or hardening agents must be used in an amount sufficient to set and harden the resin product. In general, the amount of setting agent used may vary from 5% or 6% to as high as 50%, taken on the weight of the copolymer resin. However, usually the percentage varies between about 5% and 30%.

The copolymer monohydric phenol-dihydric phenol-aldehyde permanently fusible resin may be used in connection with a setting or hardening agent in any of the arts wherein thermo-setting resins have been hitherto employed, as for example, in the manufacture of laminates, molded articles, finishes, coatings, castings, adhesives, abrasives, and the like.

The amount of the monohydric phenol and dihydric phenol present in the copolymer phenolic resin body may vary from 99% of one to 1% of the other, and 1% of one to 99% of the other.

It is desired to point out that using the resin produced in accordance with Example II, room temperature setting adhesives may be made therefrom by dissolving the resin in suitable prior art solvents such as ketones, alcohols and alcohols in water. The most suitable alcohols are the lower aliphatic alcohols up to propyl alcohol. The ketones which are most suitable are the lower alkyl ketones such as acetone and methylethyl ketone. The resins are dissolved in solvents of the above character and the pH is adjusted to a range of about 7 to about 9, and upon the addition of a setting agent such as paraformaldehyde or equivalents, the resulting mixture will harden at room temperature, that is, from about 40° F. to 100° F.

What is claimed is:

1. The method of producing a permanently fusible copolymer monohydric phenol dihydric phenol-aldehyde resin comprising heat-forming in the presence of an alkaline catalyst an undehydrated reaction product of a monohydric phenol selected from the group consisting of phenol, cresol, xylenol and cresylic acid, and an aldehyde in which the aldehyde group is the sole reactive group; separately heat-forming an undehydrated primary reaction product of a polyhydric phenol selected from the group consisting of resorcin, catechol, hydroquinone, orcin and phloroglucinol, and an aldehyde in which the aldehyde group is the sole reactive group, mixing said reaction products, the aldehyde reactants in the mixture being in the ratio to the total phenolic contents of the mixture to produce a permanently fusible resin, heating the mixture and effecting inter-condensation of the primary monohydric phenol-aldehyde condensation product with the primary polyhydric phenol-aldehyde condensation product and producing a substantially homogeneous undehydrated liquid resin, and dehydrating and further condensing said liquid resin to produce a substantially anhydrous permanently fusible copolymer condensation product.

2. The method of claim 1 wherein the monohydric phenol is selected from the group consisting of phenol, cresol, xylenol and cresylic acid and the polyhydric phenol is resorcinol.

3. The product of the method of claim 2.

4. The product of the method of claim 1.

5. The method of claim 1 in which the monohydric phenol is phenol and the polyhydric phenol is resorcinol.

6. The method of claim 1 in which the aldehyde is formaldehyde.

7. The method of producing a permanently fusible copolymer monohydric phenol dihydric phenol-aldehyde resin comprising heat-forming in the presence of an alkaline catalyst an undehydrated reaction product of a monohydric phenol selected from the group consisting of phenol, cresol, xylenol and cresylic acid, and formaldehyde; separately heat-forming an undehydrated primary reaction product of resorcinol and formaldehyde, mixing said reaction products, the formaldehyde reactants in the mixture being in the ratio to the total phenolic contents of the mixture to produce a permanently fusible resin, heating the mixture and effecting inter-condensation of the primary monohydric formaldehyde condensation product with the resorcinol-aldehyde condensation product and producing a substantially homogeneous undehydrated liquid resin, and dehydrating and further condensing said liquid resin to produce a substantially anhydrous permanently fusible copolymer condensation product.

8. The method of claim 1 in which the heat-forming reaction for the production of each phenol-aldehyde reaction product and the heating of the mixture of said reaction products are effected under reflux conditions.

PHILIP H. RHODES.

REFERENCES CITED

The following references are of record in the file of this patent:

UNITED STATES PATENTS

| Number | Name | Date |
|---|---|---|
| 1,802,390 | Novotny | Apr. 28, 1931 |
| 1,889,751 | Kessler | Dec. 6, 1932 |